United States Patent Office 3,790,621
Patented Feb. 5, 1974

3,790,621
DIALKYLPHENYL-N-METHYL-HALOACETYL
CARBAMATES
Michihiko Sakai and Yasuo Sato, Kyoto, and Rokuya Morimoto, Kazuo Konishi, and Katsuyuki Maki, Osaka, Japan, assignors to Takeda Chemical Industries, Ltd., Osaka, Japan
No Drawing. Filed May 12, 1969, Ser. No. 823,968
Claims priority, application Japan, May 11, 1968, 43/31,755
Int. Cl. C07c 125/06
U.S. Cl. 260—479 C                               4 Claims

ABSTRACT OF THE DISCLOSURE

Compounds having the general formula

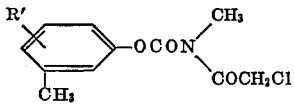

wherein R' represents the methyl group attached to the 4- or 5-position of the benzene ring or the isopropyl group attached to the 5-position of the benzene ring, possess good insecticidal properties with low toxicity to homothermal animals.

---

This invention is concerned with an insecticidal composition.

Heretofore, it has been known that although substituted phenyl N-methyl carbamate derivatives represented by the formula

(wherein R is a substituent and $n$ is an integer) possess insecticidal properties, they are accompanied by such a serious defect as being highly toxic to homothermal animals.

For the purpose of eliminating the above defect, it has been proposed to replace the hydrogen atom of the carbamic acid compound (I) with an acetyl group to produce compounds of the Formula II:

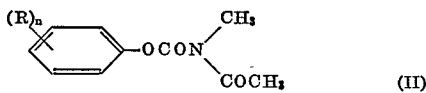

In fact, the compounds (II) have rather low toxicity to homothermal animals, but these compounds are deficient in residual action in the pesticidal properties and therefore not satisfactory in practical application.

Under these circumstances, we have conducted an extensive exploratory study on the development of novel insecticidal substances which show lower toxicity to homothermal animals but have superior residual pesticidal properties.

The study has led to the finding that compounds which are prepared by replacing an acetyl group of methyl- or isopropyl-substituted phenyl N-methyl N-acetyl carbamates with a chloroacetyl group, that is, the compounds of the formula

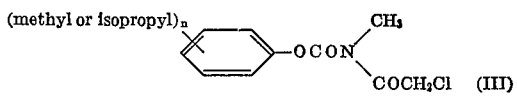

exhibit a possibility of suiting the afore-mentioned purpose.

We have continued an extensive work to reach a further finding that, in these compounds represented by the Formula III, toxicity to homothermal animals and residual pesticidal properties are greatly influenced by the number of the substituents on the benzene ring, namely, the compounds of the Formula III in which the number of the substituents on the benzene ring is 1 or not less than 3 unexpectedly show substantially no pesticidal activity, and that even if two substituents are substituted on the benzene ring, the pesticidal activity is also influenced by the position of the substituents, namely, among the compounds of the Formula III in which two substituents are substituted on the benzene ring, only the 3,5-dimethyl-, 3,4-dimethyl- and 3-methyl-5-isopropylphenyl N-methyl N-chloroacetyl carbamates show effective residual insecticidal activity as well as low toxicity to homothermal animals.

This invention is the culmination of the above findings.

It is an object of the present invention to provide new chloroacetyl carbamates which show effective residual insecticidal activity and low toxicity to homothermal animals.

Another object is to provide an insecticidal composition having effective residual insecticidal activity and low toxicity to homothermal animals.

Other objects and advantages of this invention will further become apparent hereinafter.

The chloroacetyl carbamates of the present invention are represented by the general formula

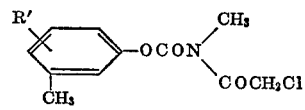

(wherein R' is a methyl group attached to the 4- or 5-position of the benzene ring or an isopropyl group attached to the 5-position of the benzene ring).

The compounds included in the above general formula are 3,4-dimethyl-phenyl N-methyl N-chloroacetyl carbamate, 3,5-dimethylphenyl N-methyl N-chloroacetyl carbamate and 3-methyl-5 - isopropylphenyl N - methyl N-chloroacetyl carbamate.

The chloroacetyl carbamate of this invention can be synthesized, for example, through the reaction as shown in the following reaction scheme

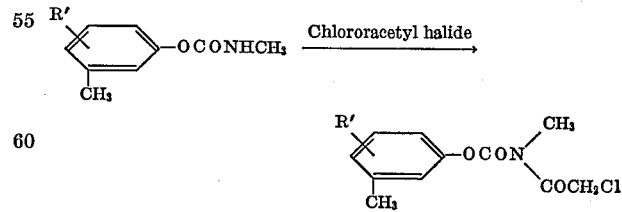

The reaction may be effected at room temperature and can be accelerated by heating, if desired.

The chloroacetyl halide, which is exemplified by chloroacetyl chloride and chloroacetyl bromide, is generally used in an amount of about 2 to 3 moles relative to one mole of the starting material. The reaction may be conducted in the presence or absence of a solvent such as benzene, toluene and xylene.

Insecticidal compositions of the present invention may be prepared, for example, by dissolving or dispersing one or more of 3,4-dimethyl-, 3,5-dimethyl- and 3-methyl-5-isopropylphenyl N-methyl N-chloroacetyl carbamates in a suitable liquid carrier, or, alternatively, admixing them with a suitable solid carrier, or allowing them to be adsorbed on the solid carrier.

If required, the compositions may further be admixed with emulsifiers, dispersing agents, suspension aids, extenders, penetrating agents, wetting agents, thickeners, stabilizers, etc., which may generally be usable for compounding agricultural formulations, to prepare oily preparations, emulsions, wettable powders, dry powders, pellets, tablets, sprays and the like.

Generally speaking, the suitable concentration of the effective constituents ranges from 10 to 90% in the case of emulsion and other liquid preparations, and from 0.1 to 10% for oily preparations, wettable powders, etc., although the said ranges may be modified as desired depending on any particular application form.

It should be understood that emulsions, wettable powders and the like may be diluted with water, for instance, to 500–2000 times as much as the initial volume.

The liquid carriers which may be conveniently employed for the compositions of the present invention include, for example, water, alcohols (e.g. methyl alcohol, ethyl alcohol, ethylene glycol, etc.), ketones (e.g. acetone, methyl-ethyl ketones, etc.), ethers (e.g. dioxane, tetrahydrofuran, Cellosolve, etc.) aliphatic hydrocarbons (e.g. gasoline, kerosene, machine oil, fuel oil, etc.), aromatic hydrocarbons (e.g. benzene, toluene, xylene, solvent naphtha, methylnaphthalene, etc.), organic bases (e.g. pyridine, collidine, etc.), and amides (e.g. dimethylformamide etc.), esters (e.g. ethyl acetate etc.), nitriles (e.g. acetonitrile etc.), and the like.

Such carriers may be employed either singly or in combination.

As the said solid carrier, vegetable powders (e.g. soybean powder, tabacco powder, walnut powder, flour charcoal powder, etc.), mineral powder (e.g. clays such as kaolin, bentonite, acid clay, etc., talcs such as talc, soap stone, etc., and silica such as diatomaceous earth, mica powder, etc.), as well as alumina, silica gel, sulfur powder, activated carbon, etc., may be successfully employed either or in various combinations.

The surface active agents to be employed as the extender, emulsifier, penetrating agent, dispersing agent, solubilizing agent, etc. mentioned hereinbefore may be exemplified by soaps, sulfuric acid esters of high alcohols, olefine sulfate, sulfonated oils, ethanolamine, higher fatty acid esters, alkylarylsulfonates, quaternary ammonium salts, alkyleneoxide type surfactants, and the like.

In addition to those agents mentioned above, it is also possible, for the purpose stated in the foregoing to employ, if required, such substances as casein, gelatin, agar, starch, bentonite, aluminum hydroxide, etc.

To these preparations may be further added various insecticides, nematocides, fungicides, herbicides, plant growth regulators, synergists, inducing agent, repellents, attractants, etc., which if required, may be blended with various nutrients, fertilizers, and the like so far as they do not adversely effect the purpose of this invention.

The present compositions are observed to have the effect to kill a wide variety of insects, and exterminate those harmful animals as exemplified below or at least lessen remarkably the number of surviving animals: The examples of plant feeding insects, etc., are Field cricket, *Acheta assimilis*
German cockroach, *Blattella germanica*
American cockroach, *Periplaneta americana*
Oriental cockroach, *Blatta orientalis*
Desert locust, *Locust migratoria*
Gladiolus thrips, *Taeniothrips simplex*
Squash bug, *Anasa tristis*
Sycamore lace bug, *Corythuca ciliata*
Apple leafhopper, *Empoasca maligna*
Green rice leafhopper, *Nephotettix cincticeps*
Oriental green rice leafhopper, *Nephotettix impiciticeps*
Brown planthopper, *Niaparvata lugens*
Smaller brown planthopper, *Laodelphax striatellus*
White backed planthopper, *Sogatella furcifera*
Apple grain aphid, *Rhopalosiphum prunifoliae*
Apple aphid, *Aphis pomi*
Green peach aphid, *Myzus persicae*
Cotton aphid, *Aphis gossypii*
Soy bean aphid, *Aphis glycinae*
Citrus mealybug, *Pseudococcus citri*
Pea weevil, *Bruchus pisorum*
Azuki bean weevil, *Callosobruchus chinensis*
Mexican bean beetle, *Epilachna varivestis*
Common cabbage worm, *Pieris rapae*
Diamond-back moth, *Plutella maculipenis*
Tobacco cutworm, *Prodenia litura*
Common armyworm, *Leucanea separata*
Mosquitoes: *Aedes aegypti, Anopheles quadrimaculatus; Culex pipiens*
Mites: *Tetranychus kanzawai, T. ulticae, Pananychus citri, P. ulmi*

For the purpose of demonstrating the superior properties of the present compositions to the known ones, the following experiments are carried out.

In the following tests, the compounds (1), (2) and (3) correspond to 3,4-dimethylphenyl N-methyl N-chloroacetyl carbamate, 3,5-dimethylphenyl N-methyl N-chloroacetyl carbamate and 3 - methyl - 5 - isopropylphenyl N-methyl N-chloroacetyl carbamate, respectively. In the instant specification and claims, percent values are by weight unless otherwise indicated.

Test 1

Comparative test between the present compounds and substituted phenyl N-methyl carbamate derivatives in their toxicity to homothermal animals.

TABLE 1

| Test compounds | $ID_{50}$ (mg./kg.) of test compounds in mouse (oral administration) |
|---|---|
| (1) | 1,520 |
| (2) | 2,750 |
| 3,4-dimethylphenyl N-methyl carbamate (control) | 40.6 |
| 3,5-dimethylphenyl N-methyl carbamate (control) | 245 |
| 3-methyl-5-isopropylphenyl N-methyl carbamate (control) | Ca. 30 |

TEST 2

Comparative tests between the present compounds and substituted phenyl N-methyl-N-acetyl carbamates in their insecticidal activity.

(1) Acaricidal activity against the Kanzawa spider-mite (*Tetranychus Kanzawai*)

An aqueous suspension containing the test compound was sprayed over potted seedling of kidney bean which were preliminarily infested by the Kanzawa spider-mites.

Two days after the spray, the survivial rates of the mites on the leaves were examined. The result is as follows.

TABLE 2—(1)

| Test compounds | Conc. of the test comp. in the sprayed solution (percent) | Percent survival |
|---|---|---|
| (1) | 0.1 | 0 |
|  | 0.05 | 0 |
| (3) | 0.1 | 0 |
|  | 0.05 | 0 |
| 3,4-dimethyl phenyl N-methyl N-acetyl carbamate (control) | 0.1 | 117 |
| 3-methyl-5-isopropylphenyl N-methyl N-acetyl carbamate (control) | 0.1 | 103 |
| Control (untreated) |  | [1] −133 |

[1] Increased.

(2) Insecticidal activity against the azuki bean weevil (*Callosobruchus chinensis*)

An acetone solution of the test compound was pipetted onto a Petri-dish (9 cm. in diameter). The volume of the solution was 1 ml. per dish. Directly after the acetone was completely evaporated, the adult females of weevil were introduced into the dish and then the dish was covered. A series of different dosages was tested for each compound and the mortality was counted 24 hours after the introduction of the insects. From the dosage-mortality relationship, a median lethal dose (LD-50) was counted as seen in following table.

TABLE 2—(2)

| Test compounds | LD-50 (μg./dish) |
|---|---|
| (1) | 76 |
| (2) | 31 |
| (3) | 8.2 |
| 3,4-dimethylphenyl N-methyl N-acetyl carbamate (control) | 158 |
| 3,5-dimethylphenyl N-methyl N-acetyl carbamate (control) | 100 |
| 3-methyl-5-isopropylphenyl N-methyl N-acetyl carbamate (control) | 95 |

TEST 3

Comparative tests between the present compounds and substituted phenyl N-methyl N-acetyl carbamate derivatives in their residual insecticidal activity.

(1) The residual insecticidal activity to white-backed planthopper (*Sogata furcifera*) and green rice leafhopper (*Nephotettix apicalis cincliceps*)

An aqeous suspension containing the test compound was sprayed over paddy rice plants (in the growth stage equivalent to about 10 tillers) cultivated in 1/5,000-are Wagner's pot. The paddy rice plants were placed in a greenhouse and after 1, 2 and 3 days, respectively, their stems were cut into about 10 cm. length, which were then placed in glass tubes, 2 cm. in inside diameter and 15 cm. long. Test insects were released into those glass tubes and the mortality rates at 24 hours after release were investigated. The result is as follows:

TABLE 3—(1)

| Test insects | Test compounds | Concentration of the test comps. in the aqueous suspension (percent) | Mortality at 24 hours after releasing (percent): Test insects are released on— | | |
|---|---|---|---|---|---|
| | | | 1 day after the spraying | 2 days after the spraying | 3 days after the spraying |
| Whitebacked planthopper | (1) | 0.025 | 100 | 100 | 75 |
|  |  | 0.05 | 100 | 100 | 100 |
| Do | (2) | 0.025 | 100 | 100 | 100 |
|  |  | 0.05 | 100 | 100 | 100 |
| Do | (3) | 0.025 | 100 | 100 | 100 |
|  |  | 0.05 | 100 | 100 | 100 |
| Do | 3,4-dimethylphenyl N-methyl N-acetyl carbamate (control) | 0.025 | 0 | 0 | 0 |
|  |  | 0.05 | 10 | 0 | 0 |
| Do | 3,5-dimethylphenyl N-methyl N-acetyl carbamate (control) | 0.025 | 10 | 0 | 0 |
|  |  | 0.05 | 40 | 15 | 0 |
| Do | 3-methyl-5-isopropylphenyl N-methyl N-acetyl carbamate (control) | 0.025 | 35 | 10 | 0 |
|  |  | 0.05 | 70 | 45 | 0 |
| Do | Water (control) |  | 0 | 0 | 0 |
| Green rice leaf-hopper | (1) | 0.025 | 100 | 100 | 90 |
|  |  | 0.05 | 100 | 100 | 100 |
| Do | (2) | 0.025 | 100 | 100 | 85 |
|  |  | 0.05 | 100 | 100 | 100 |
| Do | (3) | 0.025 | 100 | 100 | 100 |
|  |  | 0.05 | 100 | 100 | 100 |
| Do | 3,4-dimethylphenyl N-methyl N-acetyl carbamate (control) | 0.025 | 10 | 0 | 0 |
|  |  | 0.05 | 25 | 0 | 0 |
| Do | 3,5-dimethylphenyl N-methyl N-acetyl carbamate (control) | 0.025 | 25 | 0 | 0 |
|  |  | 0.05 | 45 | 15 | 0 |
| Do | 3-methyl-5-isopropylphenyl N-methyl N-acetyl carbamate (control) | 0.025 | 45 | 10 | 0 |
|  |  | 0.05 | 100 | 35 | 0 |
| Do | Water (control) |  | 0 | 3 | 0 |

(2) The residual insecticidal activity to soy bean aphid (*Aphis glycines*)

An aqueous suspension containing the test compound was sprayed over potted seedlings of soy bean. Thus treated seedlings of soy bean were then placed in open air. After 1, 2 and 3 days, soy bean aphids were released on the leaves of the sprayed plants. The mortality of the aphids was observed 24 hours after release.

The result is as follows.

TABLE 3—(2)

| Test compounds | Concentration of the test comps. in the aqueous suspension (percent) | Mortality at 24 hours after releasing (percent): Test insects are released on— | | |
|---|---|---|---|---|
| | | 1 day after the spraying | 2 days after the spraying | 3 days after the spraying |
| (1) | 0.025 | 100 | 65 | 47 |
| | 0.05 | 100 | 100 | 97 |
| (2) | 0.025 | 100 | 80 | 6 |
| | 0.05 | 100 | 100 | 100 |
| (3) | 0.025 | 100 | 100 | 95 |
| | 0.05 | 100 | 100 | 100 |
| 3,4-dimethylphenyl N-methyl N-acetyl carbamate (control) | 0.025 | 17 | 0 | 0 |
| | 0.05 | 67 | 25 | 0 |
| 3,5-dimethylphenyl N-methyl N-acetyl carbamate (control) | 0.05 | 33 | [1] −10 | [1] −23 |
| 3-methyl-5-isopropylphenyl N-methyl N-acetyl carbamate (control) | 0.05 | 67 | 35 | 15 |
| Control (untreated) | 0 | [1] −13 | 10 | [1] −20 |

[1] Increased.

TEST 4

Comparative tests between the present compound and the other chloroacetyl carbamates in their residual insecticidal activity.

(7) The residual insecticidal activity to White-backed planthopper (*Sogata furcifera*) and small brown planthopper (*Delphacodes striatella*)

The test was carried out in the same manner as Test 3–(1) to obtain the following result.

(2) Insecticidal activity to small brown planthopper (*Delphacodes striatella*)

Into solutions containing each of the test compounds in the following table were dipped stems of rice plant for 5 seconds, respectively.

After air-drying, each stem was put in a glass tube, and then test insects (10 adults) were released in each glass tube. 2.5, 6 and 20 hours later, the rate of killed insects was observed to calculate mortality rate.

TABLE 4—(1)

| Test insects | Test compounds | Concentration of the test comps. in the aqueous suspension (percent) | Mortality at 24 hours after releasing (percent): Test insects are released on— | |
|---|---|---|---|---|
| | | | 1 day after the spraying | 2 days after the spraying |
| White-backed planthopper | (1) | 0.05 | 100 | 90 |
| | | 0.025 | 36.7 | 6.7 |
| Do | (2) | 0.05 | 100 | 100 |
| | | 0.025 | 100 | 73.3 |
| Do | (3) | 0.05 | 100 | 100 |
| | | 0.025 | 100 | 100 |
| Do | 2-isopropylphenyl N-methyl N-chloroacetyl carbamate (control) | 0.05 | 63.3 | 26.7 |
| | | 0.025 | 0 | 0 |
| Do | Water (control) | | 0 | 0 |
| Small brown planthopper | (1) | 0.05 | 90.0 | 16.7 |
| | | 0.025 | 0 | 0 |
| Do | (2) | 0.05 | 56.7 | 0 |
| | | 0.025 | 0 | 0 |
| Do | (3) | 0.05 | 100 | 96.7 |
| | | 0.025 | 100 | 66.7 |
| Do | 2-isopropylphenyl N-methyl N-chloroacetyl carbamate (control) | 0.05 | 6.7 | 0 |
| | | 0.025 | 0 | 0 |
| Do | Water (control) | | 0 | 0 |

The test was carried out at 28° C.
The result is as follows:

TABLE 4—(2)

| Test compounds | Concentration of the test comps. in the aqueous suspension (percent) | Mortality rate (percent) | | |
|---|---|---|---|---|
| | | 2.5 hours after releasing | 6 hours after releasing | 20 hours after releasing |
| (1) | 0.01 | 80.0 | 96.7 | 100 |
| | 0.005 | 50.0 | 73.3 | 100 |
| | 0.0025 | 13.3 | 46.7 | 86.7 |
| (2) | 0.01 | 40.0 | 63.3 | 100 |
| | 0.005 | 33.3 | 36.7 | 63.3 |
| | 0.0025 | 0 | 10.0 | 20.0 |
| (3) | 0.01 | 33.3 | 60.0 | 100 |
| | 0.005 | 10.0 | 26.7 | 60.0 |
| | 0.0025 | 0 | 6.7 | 33.3 |
| 2,4-dimethylphenyl N-methyl N-chloroacetyl carbamate (control) | 0.01 | 30.0 | 80.0 | 90.0 |
| | 0.005 | 0 | 10.0 | 43.3 |
| | 0.0025 | 0 | 0 | 0 |
| 3-methyl-4-isopropylphenyl N-methyl N-chloroacetyl carbamate (control) | 0.01 | 0 | 0 | 0 |
| | 0.005 | 0 | 0 | 0 |
| | 0.0025 | 0 | 0 | 0 |

(3) Insecticidal activity against the azuki bean weevil (*Callosobruchus chinensis*)

The test was carried out in the same manner as Test 2—(2).

TABLE 4—(3)

| Test compounds | LD-50 (µg./dish) |
|---|---|
| (1) | 51 |
| (2) | 20 |
| (3) | 8.2 |
| 3,4,5-trimethylphenyl N-methyl N-chloroacetyl carbamate (control) | 110 |
| 2,4-dimethylphenyl N-methyl N-chloroacetyl carbamate (control) | 250 |
| 3-methyl-4-isopropylphenyl N-methyl N-chloroacetyl carbamate (control) | 680 |

In the following examples, the relation between "weight part" and "volume part" corresponds to that between gram and milliliter.

Example Part A—Preparations of the present compounds (1) To 9.0 weight parts of 3,4-dimethylphenyl N-methyl carbamate is added 19.0 weight parts of chloroacetyl chloride, followed by heating under reflux for 4 hours. The unreacted chloroacetyl chloride is distilled off under reduced pressure and 10 volume parts of water is added to the resulting residue to obtain solid substances. The solid substances are dried and then recrystallized from n-hexane to give 3,4-dimethylphenyl N-methyl N-chloroacetyl carbamate as needles melting at 56° C.–58° C. Yield 9.8 g. (77%).

(2) A similar procedure to the above example is taken by using 3,5-dimethylphenyl N-methyl carbamate in place of 3,4-dimethylphenyl N-methyl carbamate, whereby 3,5-dimethylphenyl N-methyl N-chloroacetyl carbamate is produced as needles melting at 73°–74° C.

(3) A similar procedure to the above Example 1 is taken by using 3-methyl-5-isopropyl N-methyl carbamate in place of 3,4 - dimethylphenyl N - methyl carbamate, whereby 3-methyl-5-isopropyl N-methyl N-chloroacetyl carbamate is produced as oil boiling at 155°–158° C./1. mm. Hg. Yield 88%.

Example Part B—The insecticidal composition (1) An emulsion comprising a mixture of 30 weight parts of compound (1), 50 weight parts of xylene and 20 weight parts of polyoxyethylenediphenyl ether.

(2) A wettable powder comprising a finely divided mixture of 50 weight parts of compound (2), 5 weight parts of sodium lignin sulfonate, 5 weight parts of polyoxyethylene nonylphenol ether and 40 weight parts of clay.

(3) A fine powder comprising a mixture of 2 weight parts of compound (3), and 98 weight parts of clay.

(4) A granular preparation obtained by mixing and molding 5 weight parts of compound (3), 20 weight parts of bentonite and 75 weight parts of clay.

What is claimed is:

1. A compound having the general formula

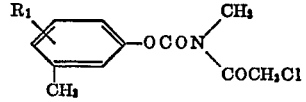

wherein R' represents the methyl group attached to the 4- or 5-position of the benzene ring or the isopropyl group attached to the 5-position of the benzene ring.

2. A compound as in claim 1 said compound being 3,4-dimethylphenyl N-methyl N-chloroacetyl carbamate.

3. A compound as in claim 1 said compound being 3,5-dimethylphenyl N-methyl N-chloroacetyl carbamate.

4. A compound as in claim 1 said compound being 3-methyl-5-isopropylphenyl N-methyl N-chloroacetyl carbamate.

References Cited

UNITED STATES PATENTS

| 3,402,246 | 9/1968 | Haubein | 260—479 |
| 2,992,966 | 7/1961 | Jacobi et al. | 260—479 |
| 3,167,472 | 1/1965 | Czyzewski et al. | 260—479 |
| 3,404,208 | 10/1968 | Robertson et al. | 260—479 |

JAMES A. PATTEN, Primary Examiner

U.S. Cl. X.R.

424—300